Patented Feb. 5, 1929.

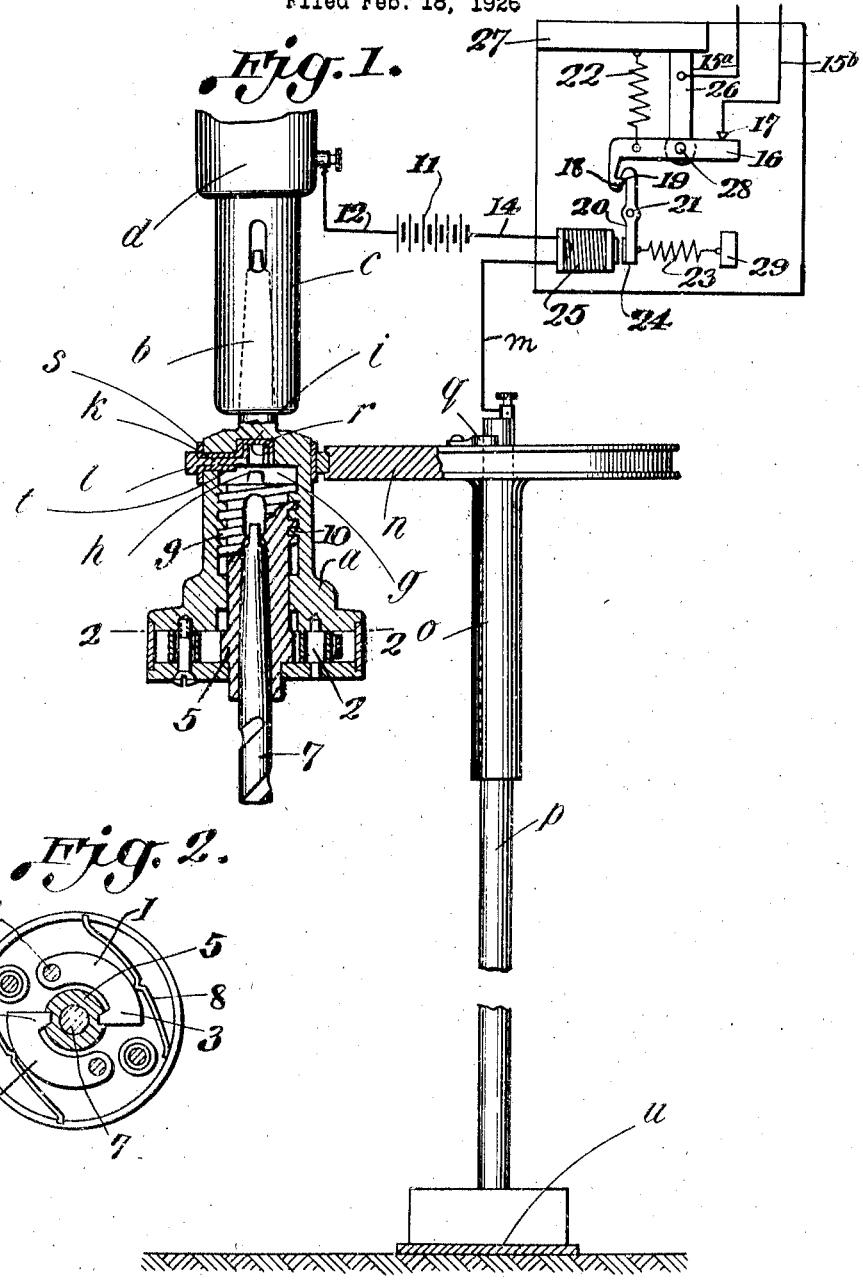

1,701,423

UNITED STATES PATENT OFFICE.

HARRY SAUVEUR, OF LANKWITZ, BERLIN, GERMANY, ASSIGNOR TO FLEX-O-INDUS-TRIE-GESELLSCHAFT, M. B. H., OF BERLIN, GERMANY.

SPINDLE-RELEASING DEVICE FOR DRILLING MACHINES.

Application filed February 18, 1926, Serial No. 89,120, and in Germany March 1, 1925.

This invention relates to spindle releasing devices for drilling machines, of the kind in which upon the permissible speed of rotation being exceeded the drill chuck is arranged to stop further rotation of the drill, and after such rotation has been stopped the drill is set free to move in an axial direction, the forward or downward movement of the spindle then remaining inoperative for a certain time so that the machine attendant has an opportunity to stop the machine before the axial play of the drill has been overtaken by the downward movement of the spindle.

Cases may however occur where the utilization of such opportunity is not always possible, for example when a workman has to attend to several drilling machines at the same time, or when the noise of the workshop is so great or the lighting conditions so unfavourable that the workman fails to notice an exceptional failure to act on the part of the drill, and consequently injury may be done to the drill, the piece of work, or the drilling machine.

The object of the present invention is to remove these difficulties, and the invention consists in utilizing the axial displacement occurring upon the discontinuance of the relative rotation of the drill, for closing an electric circuit by means of which the stoppage of the spindle thrust, or if necessary the complete stoppage of the machine, can be effected. According to this invention the drill chuck is provided, at that part where space is allowed for the axial displacement of the drill, with a unipolar contact which is connected by means of an insulated lead with an insulated contact ring surrounding the drill chuck, which ring makes contact with a pole of the electric circuit to cause the stoppage of the machine.

The closing of the circuit can also be used for producing a signal of either an optical or audible nature, or both.

Referring to the drawing, wherein is disclosed a preferred embodiment of the invention:

Figure 1 is a side elevation of the machine with parts in section for clearness of illustration.

Figure 2 is a sectional view taken substantially along the line 2—2 of Figure 1.

In the example shown the drill chuck $a$ provided with an excess load coupling, is inserted with its tapered shank $b$ in the spindle $c$, with the guide $d$ of which is connected one pole 12 of a circuit comprising the electric signal or stop motion. The clearance space $g$ in the interior of the chuck permits axial displacement of the drill against the chuck. Within the clearance space $g$ is located a contact device, which consists of the contact pin $h$, and the counter contact $i$ located in the chuck from which it is insulated; this counter contact is connected by means of an insulated wire $k$ with the contact ring $l$ insulatively mounted upon the chuck casing. The electrical connection of the contact ring $l$ with the conductor $m$ is effected by means of a disc $n$ mounted in a rotatable and displaceable manner upon a rod $p$ by means of a sleeve or hub $o$ and which disc rolls against the said ring $l$; the said disc $n$ can be provided with a contact spring $q$ sliding upon the rod $p$ in order to protect the conductor $m$.

If upon the action of the overloading coupling, axial displacement of the contact pin $h$ should take place, then the circuit will be closed and the stop motion will come into action, so that danger of injury to the drill is avoided.

From the foregoing description, it will be well understood, that the object of the present invention is not the provision of an overload coupling for drill spindles, such overload couplings already existing in many varieties of constructions, usually depending on the action of springs. These are effective in hand operated drills, where the workman will naturally cease to apply the power when he observes that disengagement has occurred, and they may also be quite sufficient in machine tools driven by other than manual power provided the workman quickly stops the application of the drive to the drill chuck, that is to say, before the continued feeding of the drill has over-run the clearance allowed by the disengaging mechanism; otherwise damage would only be deferred by the action of the overload coupling. In the present invention, however, means are provided for automatically bringing about the discontinuance of the rotation of the drill spindle when excessive resistance is encountered so that such damage is not only deferred but altogether avoided, irrespective of prompt attention on the part of the workman, and this advantage is obtained in an extremely simple manner by utilizing the axial displacement which usually occurs upon the discontinuance of rotation of the drill to cut off the supply of electrical power either from an individual drill spindle or if desirable, from the whole drilling machine in the case of a machine having a plurality of drill spindles. The invention as described with reference to Figure 1 is applicable to any overload coupling in the action of which such axial displacement takes place, but its application to one construction of overload coupling taken as an example will be clear from the slightly more detailed drawings, Figures 1 and 2. This coupling comprises two tappets 1 and 1ª adapted to pivot on pins 2 and having hooked ends 3 normally registering in recesses in the tool holder 5 in the tapered bore of which the drill 7 is held in known manner. These tappets are pressed against the holder 5 by springs 8, the pressure of which springs can be adjusted in any known or suitable manner. The holder 5 is provided with a screw thread 9 working in an internal screw thread 10 formed in the chuck a. When the resistance to the boring action of the drill becomes so great as to overpower the springs 8 and allow the holder 5 to disengage itself from the hooks 3, the holder screws itself upward in the chuck until the pin h, of the said holder meets the counter contact i, and completes a circuit to cause any suitable cut-out switch to disconnect the drill spindle from the source of power.

In the example diagrammatically represented in Figure 1 the electrical lead 15ª, is connected with an arm 26 fixed on a part 27 of the framework on which arm 26 is pivoted at 28 an arm 16 having a hook 18, and connected by a spring 22 in tension with the said part 27. Another arm pivoted at 21 carries at one end a hook 19, adapted to engage the said hook 18, and at the other end an armature 24. This arm 20 is normally held with its hook 19 in engagement with the hook 18 by the spring 23 in tension, anchored to a fixed part 29 of the framework, and in this position the current for the motor is closed by the arm 16 resting in contact at 17, with the lead 15ᵇ. When the contacts h and i are closed, current from a battery 11 passes over the wire 12, and through the parts d, c, b, a, 5, i, n, to the wire m; this wire m and the second wire 14 from the battery 11 then excite an electromagnet 25, which attracts the armature 24, extending the spring 23 and rocking the arm 20 so that its hook 19 releases the hook 18 on the arm 16, whereupon the spring 22 contracts and moves the arm 16 away from the contact piece 17 on the lead 15ʰ to open the motor circuit and allow the drill to come to a standstill. The motor and the drilling machine are too well known to need illustration. In the case of a drilling machine which is not electrically driven, the disengagement of a hook such as the hook 18 described may cause or permit the action of any suitable stop motion to occur.

r, s, t and u are insulations.

What I claim and desire to secure by Letters Patent of the United States is:—

1. In a drilling machine, a spindle, a chuck, a drill adapted to be displaced axially in relation to said chuck, a contact member within said chuck, a second contact member partaking of such axial movements of said drill and adapted to engage the first named contact member, said contact members forming parts of an electrical circuit adapted when completed by such engagement of said contact members to bring about the stoppage of the forward movement of said spindle and the actuation of a warning signal.

2. In a drilling machine, a spindle, a chuck, a drill adapted to be displaced axially in relation to said chuck, a ring secured outside said chuck, a contact member within said chuck electrically connected with said ring, a second contact member partaking of such axial movements of said drill and adapted to engage the first named contact member, said contact members forming parts of an electrical circuit adapted when completed by such engagement of said contact members to bring about the stoppage of the forward movement of said spindle.

3. In a drilling machine, a spindle, a chuck, a drill adapted to be displaced axially in relation to said chuck, a ring secured outside said chuck, a rotatable and axially displaceable disc adapted to roll in contact with said ring, a contact member within said chuck electrically connected with said ring, a second contact member partaking of such axial movements of said drill and adapted to engage the first named contact member, said contact members, ring, and disc forming parts of an electrical circuit adapted when completed to bring about the stoppage of the forward movement of said spindle.

4. In a drilling machine, a spindle, a chuck, a drill adapted to be displaced axially in relation to said chuck, a ring secured outside said chuck, a rotatable and axially displaceable disc adapted to roll in contact with said ring, a contact member within said chuck electrically connected with said ring, a second contact member partaking of such axial movements of said drill and adapted to engage the first named contact member, said contact members, ring, and disc forming part of an electrical circuit adapted when completed to bring about the stoppage of the said machine.

HARRY SAUVEUR.